Figure 1:
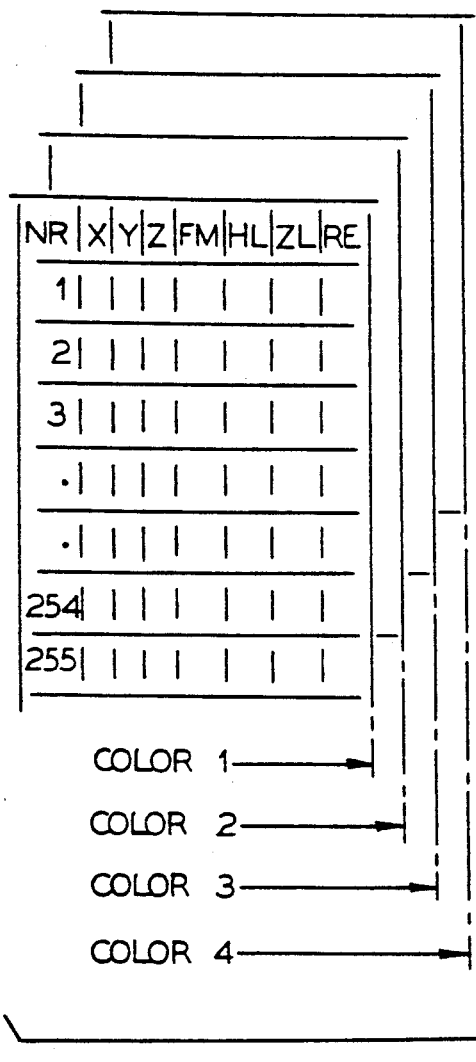
Figure 1:
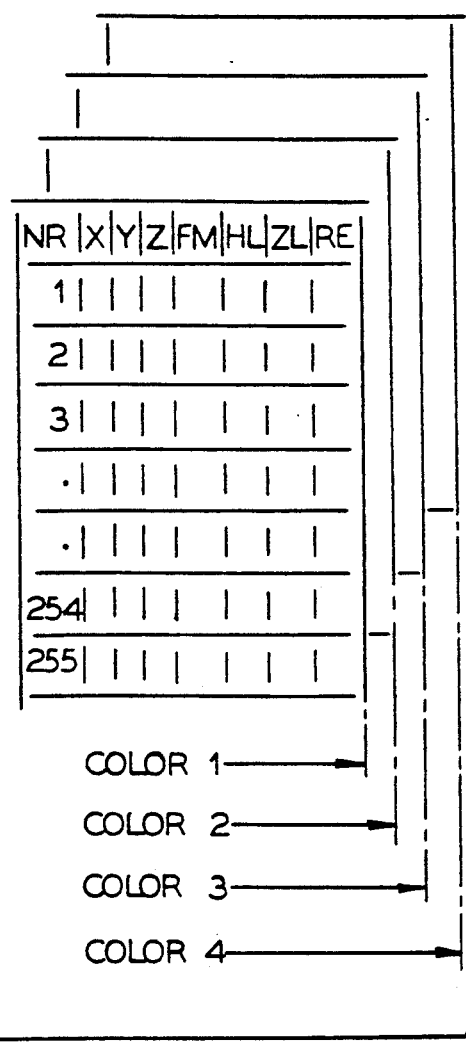

United States Patent [19]
Schweiker et al.

[11] Patent Number: 5,184,051
[45] Date of Patent: Feb. 2, 1993

[54] METHOD FOR PROGRAM CONTROL FOR AN INDUSTRIAL ROBOT FOR AUTOMATIC COATING OF WORKPIECES

[75] Inventors: Werner Schweiker; Volker Leininger, both of Grenchen, Switzerland

[73] Assignee: Behr-Industrieanlagen GmbH & Co., Fed. Rep. of Germany

[21] Appl. No.: 293,564

[22] Filed: Jan. 3, 1989

Related U.S. Application Data

[63] Continuation of Ser. No. 60,726, Jun. 10, 1986, abandoned.

[30] Foreign Application Priority Data

Oct. 6, 1986 [DE] Fed. Rep. of Germany ....... 3619429

[51] Int. Cl.$^5$ ............ G05B 19/42; B67D 5/08
[52] U.S. Cl. .................. 318/568; 318/567; 364/192; 901/43; 239/69; 395/80
[58] Field of Search ............ 318/567, 563, 568, 573, 318/625, 565, 566, 569; 901/7, 14, 9, 22, 29, 43, 50; 239/69, 305, 290, 397, 587, 588, 694, 706, 708; 414/732, 735, 738, 744.2, 912; 118/323, 326, 695, 697, 696, 698, 704, 705, 668, 707, 629, 630, 631, 683, DIG. 7

[56] References Cited

U.S. PATENT DOCUMENTS

| | | | |
|---|---|---|---|
| 3,674,207 | 7/1972 | Carbonett et al. | 901/43 X |
| 3,909,801 | 9/1975 | Tokura et al. | 364/192 X |
| 4,178,632 | 12/1979 | Anthony | 364/192 X |
| 4,278,046 | 7/1981 | Clarke et al. | 901/43 X |
| 4,362,124 | 12/1982 | Fleig | 239/69 X |
| 4,481,591 | 11/1984 | Spongh | 364/192 X |
| 4,484,120 | 11/1984 | Olex et al. | 901/43 X |
| 4,484,294 | 11/1984 | Noss | 901/43 X |
| 4,486,843 | 12/1984 | Spongh et al. | 901/43 X |
| 4,606,001 | 8/1986 | Rieben et al. | 364/192 X |
| 4,613,943 | 9/1986 | Miyake et al. | 318/568 X |
| 4,614,300 | 9/1986 | Falcoff | 239/69 X |
| 4,641,236 | 2/1987 | Brooks | 364/192 X |
| 4,714,044 | 12/1987 | Kikuchi et al. | 901/43 X |
| 4,721,630 | 1/1988 | Takeo et al. | 901/43 X |

OTHER PUBLICATIONS

"No novice in surface coating", Decade of Robotics, 1983, pp. 67–67.

*Primary Examiner*—William M. Shoop, Jr.
*Assistant Examiner*—Paul Ip
*Attorney, Agent, or Firm*—Reising, Ethington, Barnard, Perry & Milton

[57] ABSTRACT

In the program control of a robot intended for painting vehicles and in order to facilitate finding the numerous coating parameters stored in a robot movement program, coordination between the process parameter change point and the relevant coating parameters is to be obtained. To this end, and to establish a path of movement, an individual address is associated with each process parameter change point and, based upon the movement program, a separate parameter file is employed in which the relevant coating parameters are associated with the individual addresses. According to the subject method, the configuration of the workpiece to be coated is shown upon a display screen and, by utilizing the movement program, the selected process parameter change points are indicated visibly upon the workpiece shown.

12 Claims, 2 Drawing Sheets

METHOD FOR PROGRAM CONTROL FOR AN INDUSTRIAL ROBOT FOR AUTOMATIC COATING OF WORKPIECES

This application is a continuation of application Ser. No. 060,726, filed Jun. 10, 1986, now abandoned.

TECHNICAL FIELD

The subject invention relates to a method for program control of an industrial robot for automatic coating of workpieces wherein a workpiece is initially coated by continual control of the moving device and by control of its coating unit.

BACKGROUND ART

Typically, in automatic paint-spraying operations, it is common to employ a robot during the painting operations. The movements of the robot are controlled by a program which maps the movement of the painting robot in relation to specific points on the object to be coated. Presently, in the prior art, it is necessary to produce the movement program whereby the path to be followed by a coating unit (spray gun) in relation to the body is controlled and it is also necessary to store the various coating parameters arising for each individually selected process parameter change points. These coating parameters include, for example, the amount of paint and the pressure and amount of atomizing air and horn-air which determine the shape and strength of the coating spray. Establishing this robot path and storing this data is normally done by hand with the aid of a "Teach-in" keyboard (cf. H. J. WARNECKE, R. D. SCHRAFT "Industrieroboter," 2nd Edition 1979, pages 33–36)

Because of the large number of coating parameters necessary to obtain a satisfactory coating, this programming is tiresome and time-consuming. Further, if the program has to be subsequently changed, for example because certain locations upon the body are not properly coated, special problems arise. In this case, because of the many paint-impingement points selected, it is very difficult with prior art methods to find the data pertaining to a specific location on the body in the stored program. In fact, up until now, it has been impossible for the programmer to associate the actual process parameter change points on the body with the stored parameters. Therefore, whenever the program had to be changed, the programmer had to move the spray gun along the robot path opposite the body to be coated step-by-step, following the program.

Since it is necessary to control not only the movement of the robot, but also additional parameters, such as horn-air, atomizing air, and the amount of paint used for the coating, prior art methods have other disadvantages. For example, according to the methods presently practiced to obtain uniform coating of differently shaped details of a body, either the robot is moved at a constant speed and the amount of paint discharged and other parameters are controlled, or the speed of the robot only is varied. In the latter case, the robot is required to move at very high speeds. If it is desired to obtain uniform coating thickness on all body details, speeds in excess of 1.5 m/sec are required at certain locations. As a result of delays in the accelerating phases and other restrictions in present-day robot systems resulting in a maximum track velocity of 1.5 m/sec, programming and optimizing are very time-consuming.

However, a certain amount of adaptation is possible by varying the distance between the spraying unit and the part to be coated, with little or no structural differences in the surface of the paint. Moreover, if the same objects are to be coated with different coloring materials, appropriate changes in the movements along the robot track must be carried out for each material. Thus, if the same objects are to be coated with different paints, it has been necessary to draw different movement programs, which means considerable expenditure on programming.

STATEMENT OF INVENTION AND ADVANTAGES

It is the purpose of the subject invention to provide a method which insures faster and simpler programming than heretofore known and which more particularly simplifies subsequent program changes. Accordingly, the subject invention is directed toward a method for program control of an industrial robot for the automatic coating of workpieces wherein a sample workpiece is initially coated by manual control of the moving device and of its coating unit. The method comprises the steps of creating a movement program for the moving device with storage of local parameters of the coating device for selected paint impingement points and information regarding the necessary amount of paint and other coating parameters being stored for each selected impingement point at which process parameter changes are carried out; controlling the moving device for automatic coating by the movement program and the stored coating parameters; representing the stored parameters in tabular form for checking or modification; providing an individual address for each selected paint impingement point; and providing a separate parameter file in which the coating parameter required for the relative point is associated with the addresses of the relevant paint impingement points.

According to the teachings of the subject method, when the movement program is drawn up for each paint impingement point at which process parameter changes are carried out, an individual address is produced. It is therefore possible, when separating the movement program from the coating parameter data, for the coating parameter data to be called up through the addresses contained in the movement program. This feature produces a clear association between each process parameter change point along the path of movement, the corresponding points upon the workpiece itself, and the relevant coating parameters. For each process parameter change point on the workpiece to be coated, it is possible to determine the position of the robot quickly and without difficulty and to find a relevant group (lines) of stored coating parameters. Similarly, the person operating the system always knows accurately where a specific point of the stored program is located on the actual workpiece, which has not been readily possible in the prior art. It is particularly simple and convenient, with the aid of a graphic representation of the object to be coated to call up the data on a display screen by selecting the desired point and to alter them if necessary. Another advantage is that it is possible to alter the data while the robot is in operation without affecting the path of movement.

The invention is suitable not only for "robots" in the usual meaning of the word, but also for any programmable, especially multiaxial, moving device in which the aforementioned problems arise. All of the essential steps of the program control method described herein can be carried out with the aid of a commercially available computer system.

FIGURES IN THE DRAWINGS

Figure 2A:
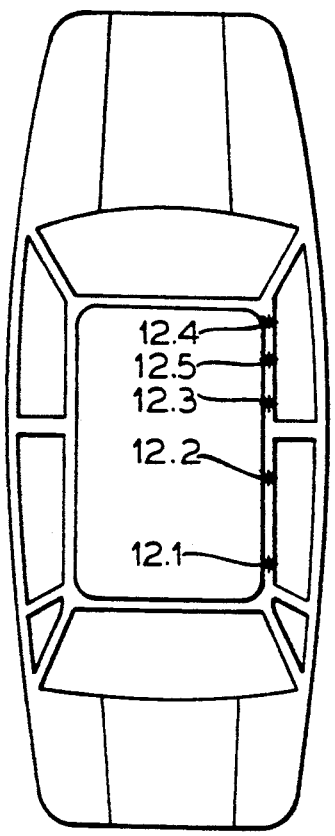
Figure 2B:
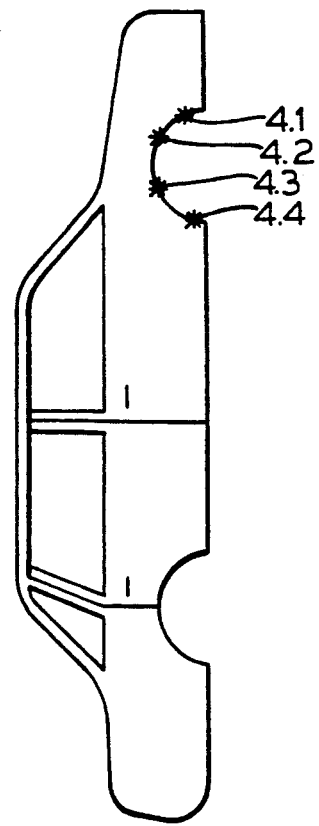

Other advantages of the present invention will be readily appreciated as the same becomes better understood by reference to the following detailed description when considered in connection with the accompanying drawings wherein:

FIG. 1 is a diagrammatical representation of the file to be produced for the coating parameters; and FIGS. 2 a and 2b are graphic representations of the body on a display screen.

In order to program the robot, the movement program for the part of the body to be processed (e.g. a roof-rail or a fender) is drawn up in accordance with "Teach-in" methods which are known in the prior art and which need not be described here. The necessary coating parameters for the individual points "taught" are also stored. According to the invention, however, an address is defined for each process parameter change point in the movement program, and this is released with the relevant parameter data. For example, 255 different points may be provided.

While the movement program is being produced, it may be preferable to vary both the speed of the coating unit, the amount of paint, and the other coating parameters. This eliminates the disadvantages of existing methods, mentioned above, namely moving the robot at different speeds, but leaving the coating parameters unchanged. In the case of certain body details, it may be desirable to move the coating unit linearly over paint impingement points at different distances from the body to obtain uniform coating of the surface with correspondingly different coating parameters.

Based upon the process parameter changes in the movement program and according to the subject method, a file is produced with the structure shown diagrammatically in FIG. 1. In this example, a table is needed for each of four different paint colors with which a specific body of a given configuration can be coated. The lines associated with the 255 points each contain in coded form the following information: the address, NR, defined in the movement program; the space coordinates X,Y,Z defining the location of the spray unit in relation to the body; and the control information, including the designations: FM for the amount of paint; HL for the horn-air; ZL for the atomizing air; and RE for any other control functions which may be necessary. The number of individual parameters may be extended as required. Each line thus corresponds to a special spray jet adapted to the particular detail to be painted.

After the first table has been prepared for a first color for a given first body, corresponding tables are produced with the parameters to be changed for the remaining colors. Also, corresponding tables for a given number, n, of differently shaped bodies may be prepared. Although for a body area of a given shape, different table parameter values are required for different colors, different movement programs are not required. The same applies to movement programs drawn up from coating other body areas (doors, engine-bays, etc.). An individual file module is put together for each body area which can be called up by its address.

For instance, addresses NR corresponding to line numbers 1 to 255 may consist of 8 bits, while the coating parameters, by means of which, for example, the valves of a conventional spraying unit are controlled, may consist of 16 bits.

In one case of prior art methods, in order to find a "taught" process parameter change point on the body, the movement program must first be moved to this point. In contrast to this, it is a simple matter according to the invention to change any coating parameter as soon as the associated address, NR, is determined. Further, these changes can be made while the unit is in operation, especially when a specific location on the body is not being properly coated, since the relevant parameters in the stored program can be found very quickly when using the method of the subject invention. In this connection, it is particularly desirable to show the body to be coated graphically, according to FIG. 2, upon a display screen of a computer system, and to mark visibly upon this display the process parameter change points selected during the "Teach-in" for the movement program. Identifying information is also written on the marking points, e.g., numbers, letters and/or other symbols. In the example illustrated, points 12.1 to 12.5 of the right-hand roof rail and points 4.1 to 4.4 of the fender have been marked.

The graphic representation of the body and the calling up of the parameter data are preferably carried out on the same display screen. The body and the tables may be shown on a single screen side-by-side or, under certain circumstances, one after the other.

Now if the coating parameters are to change from a specific paint impingement point onwards, the part of the table in the parameter file, with the lines pertaining to this point, may be called up on the graphic display of the body. This may be done by selecting the marking point with a light pen or the cursor of the display screen and the resulting address of the corresponding stored data. The desired changes are then made in the lines which have been called up.

Additions are also readily possible by prior definition of a process parameter change point in the movement program, followed up by calling up the corresponding table and entering the data pertaining to the new point in an additional line which is inserted at the necessary location. It is just as simple to delete points no longer wanted from the movement program and the picture of the body; relevant data in the table retrieved for this purpose may also be deleted or blocked from retrieval.

The new changed data are accepted by the control system of the coating unit as soon as the relevant lines are called up again in the course of the movement program.

After the movement program has been completed, it may be determined, by means of a test routine, whether all points in the table were called up, and any defect may be reported. A defect report may also occur if a process-parameter change point, which is not defined in the relevant file is called up from the movement program.

In the course of the program, the read-control commands for adjusting the amount of paint, air, etc., are sent by the robot control system to a parameter control system which, in turn, controls the control units for the relevant parameters. The program control may be further improved by taking into account the different derivation-action times for the coating parameters which can be varied at different speeds, for example, by valves. In particular, the units used today to control the amount of paint for a body-coating unit respond more quickly to a change command than do the units at present used to control the amount of air. If the read control commands for the amount of paint and air were to be released simultaneously to the relevant control units, incorrect spraying conditions could arise initially because the correct amount of air for the amount of paint would not be available immediately. The same may apply to other parameters. For this reason, according to the subject invention, at least two different transfer signals are always released by the robot control system in the course of the control program. One of these signals, the one which controls the setting of the more rapidly variable parameter (the amount of paint), is released to the parameter control system, as the robot travels along the path of movement, earlier than the other signal and the parameter control system transfers the control command more quickly, i.e., earlier, to the relevant unit controlling the amount of air. In each case this produces simultaneous adjustment or change in the coating parameters. These different transfer signals optimize the characteristics of the relevant parameters.

Flowchart A and B describe the method of program control of a moving device having a coating unit for automatically coating workpieces. Flowchart A refers to producing the movement program, whereas Flowchart B refers to the control by the movement program.

Flowchart A:

Flowchart A:

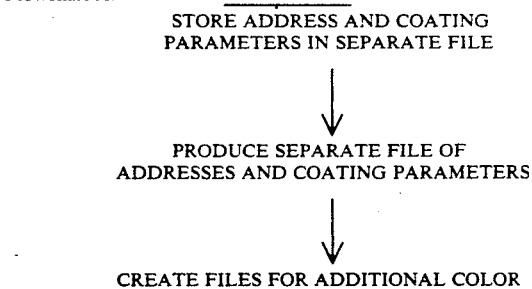

As illustrated in Flowchart A, the method includes the steps of producing a movement program for the moving device with storage of local parameters of the coating device for selected impingement points and storage of information regarding the necessary amount of paint and other coating parameters for each selected impingement point at which process parameter changes are carried out, establishing an address for each paint impingement point, and producing a separate parameter file containing in tabulated form coded addresses corresponding to the addresses of the paint impingement points and the stored coating parameters for each of the paint impingement points. After the movement program is produced, the moving device is controlled for automatic coating by the moving program and the stored parameters.

Flowchart B:

START ⟶ AUTOMATICALLY RUN MOVEMENT PROGRAM
↓
CONTROL MOVING DEVICE
↓
DISPLAY WORKPIECE
↓
DISPLAY MARK POINTS ON WORKPIECE
↓
SELECT MARKED POINTS AND ADDRESS
↓
DISPLAY TABULATED COATING PARAMETERS FOR CHECKING/MODIFICATION

As illustrated in Flowchart B, the method further includes controlling the moving device for automatic coating by the movement program and stored coating parameters, displaying the configuration of the workpiece to be coated on a display screen, marking selected paint impingement points upon the workpiece shown on the display screen, selecting a marked point and the resulting address, displaying the parameters associated with the marked point in tabular from on the display, and checking the tabulated coating parameters.

The invention has been described in an illustrative manner, and it is to be understood that the terminology

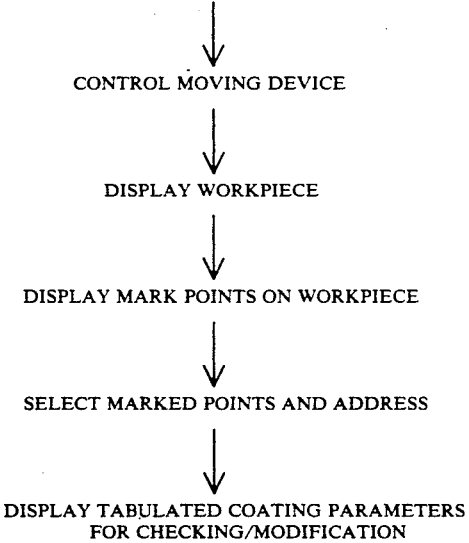

which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of program control of a moving device having a coating unit for automatically coating workpieces, the method including the steps of; manually moving the moving device and its coating unit and producing a movement program for the moving device with storage of local parameters of the coating device for selected impingement points and storage of information regarding the necessary amount of paint and other coating parameters for each selected paint impingement points where process parameters changes are carried out, establishing an address for each paint impingement point, and producing and maintaining a parameter file separate from the movement program containing in tabulated form coded addresses corresponding to the addresses of the paint impingement points and the stored coating parameters for each of the paint impingement points.

2. A method according to claim 1 further characterized by controlling the moving device for automatic coating by the movement program and the stored parameters.

3. A method according to claim 1 further characterized by producing a separate file for each coloring material to be processed using the movement program in the case of a given geometric shape of the workpiece to be coated for all coloring materials.

4. A method according to claim 1 further characterized by storing within the parameter file the space coordinates (X,Y,Z) of the moving device for the individual points with the coating parameters.

5. A method according to claim 1 further characterized by displaying the configuration of the workpiece to be coated on a display screen and marking selected paint impingement points upon the workpiece shown on the display screen.

6. A method according to claim 5 further characterized by tabulating jointly the parameters associated with a marked point and information identifying the relevant point on the screen.

7. A method according to claim 6 further characterized by automatically calling up and displaying coating parameters pertaining to a point by activating one of the marked points upon the displayed workpiece.

8. A method according to claim 6 further characterized by writing in the displayable tables and at the marked points in the pictorial representation of the workpiece numbers or other information which identify individual paint impingement points.

9. A method according to claim 8 further characterized by varying the speed the coating unit and the amount of paint and other parameters during the coating process when producing the movement program.

10. A method according to claim 9 further characterized by moving the coating unit along a track at a varying track controlled distance from the paint impingement point upon the workpiece, and applying corresponding variable coating and other coating parameters of the part surface of the workpiece determined by the track.

11. A method according to claim 9 further characterized by producing at least two different transfer control signals for coating parameters which can change faster or more slowly and receiving the control commands for adjusting the parameters which vary more slowly and transferring them faster to the relevant controller than the other control commands so the action of the different coating parameters coincides chronologically.

12. A method of controlling an industrial moving device or robot for automatically coating workpieces wherein a sample workpiece is initially coated by manually moving a moving device and its coating unit producing a movement program for the moving device with storage of local parameters of the coating device for selected impingement points and storage of information regarding the necessary amount of paint and other coating parameters for each selected paint impingement points at which process parameters changes are carried out with an address established for each paint impingement point and producing a separate parameter file in tabulated form containing coded addresses corresponding to the addresses of the paint impingement points and the coating parameters for each paint impingement point, the method comprising the steps of; controlling the moving device for automatic coating by the movement program and stored coating parameters, displaying the configuration of the workpiece to be coated on a display screen, marking selected paint impingement points upon the workpiece shown on the display screen, selecting a marked point and the resulting address, displaying the parameters associated with the marked point in tabular form on the display, and checking the tabulated coating parameters.

* * * * *